(12) United States Patent
Hartman et al.

(10) Patent No.: US 6,296,009 B1
(45) Date of Patent: Oct. 2, 2001

(54) ARM-DRIVEN SLEEVE VALVE WITH CENTRALIZED DRIVE MECHANISM

(76) Inventors: Thomas A. Hartman, 700 Capac Ct., St. Louis, MO (US) 63125; Brian T. Hartman, 2253 E. Contessa Cir., Mesa, AZ (US) 85213

( * ) Notice: Subject to any disclaimer, the term of this patent is extended or adjusted under 35 U.S.C. 154(b) by 0 days.

(21) Appl. No.: 09/627,570

(22) Filed: Jul. 28, 2000

(51) Int. Cl.[7] .................................................. F16K 3/26
(52) U.S. Cl. .................... 137/219; 251/231; 251/249.5
(58) Field of Search ......................... 137/219; 251/231, 251/249.5

(56) References Cited

U.S. PATENT DOCUMENTS

| | | |
|---|---|---|
| 4,579,477 | 4/1986 | Hartman . |
| 5,116,252 | 5/1992 | Hartman . |
| 5,950,660 | * 9/1999 | Hartman et al. .................... 137/219 |

* cited by examiner

Primary Examiner—Gerald A. Michalsky
(74) Attorney, Agent, or Firm—Howell & Haferkamp, LC

(57) ABSTRACT

An arm-driven sleeve valve utilizes a single pin connection to transmit torque from a shaft of the sleeve valve to a pair of arm portions suspended therefrom for controlling the flow of fluid from the valve by axially moving a gate. The single pin connection is centrally positioned between the arm portions and ensures the each of the arm portions exerts an equal force on the gate, regardless of torsional deflection of the shaft. Use of the invention allows arm-driven sleeve valves to be driven asymmetrically from only one of opposite axial ends of the shaft without tending to bind the gate against the main body of the valve.

21 Claims, 3 Drawing Sheets

ARM-DRIVEN SLEEVE VALVE WITH CENTRALIZED DRIVE MECHANISM

BACKGROUND OF THE INVENTION

This invention relates generally to large industrial flow control valves, and more particularly, to arm-driven sleeve valves.

Conventional sleeve valves have been employed to control the flow rate and head pressure of fluids in industrial piping systems. Sleeve valves are often utilized for their ability to operate without the moving components of the valve having to work against the head pressure of the fluid being supplied to the valve. A conventional arm-driven sleeve valve comprises a horizontally-oriented, tubular main body, and a tubular gate slidably engaged around the main body for controlling the flow rate of fluid from the valve.

The main body of a conventional arm-driven sleeve valve has a tubular wall that defines a fluid passage configured to receive fluid from a fluid supply line attached to a first axial end of the main body. An imperforate bulkhead at an opposite second axial end of the main body prohibits the fluid from flowing out the second axial end. At least one discharge opening extends through the tubular wall of the main body for discharging fluid from the fluid passage and into a tank or stilling well in which the valve is placed.

The sleeve valve is operated by axial movement of the tubular gate relative to the main body. The tubular gate is generally cylindrical and acts as a sleeve around the main body that can be axially moved between open and closed positions. In the closed position the gate is axially positioned so that all the discharge openings of the main body are axially between opposite ends of the gate. In the open position, the gate is axially positioned to one side of the discharge openings and thereby allows fluid to pass through the discharge openings of the main body into the tank or stilling well. Additionally, the gate can be variably positioned axially between the open and closed positions where the gate will partially cover the discharge openings to control the rate of fluid flow from the main body.

The axial movement of the gate of a conventional arm-driven sleeve valve is provided by a drive system comprised of a pair of swinging arms that translate rotational motion of a shaft into axial motion of the gate. In a convention arm-driven sleeve valve, the shaft of the drive system is mounted to the sleeve valve for rotation about the shaft's longitudinal axis. The arms are mounted to the shaft and extend away from the shaft axis such that as the shaft is rotated about its axis, a distal end of each of the arms will move along an arcuate path. By mounting the shaft to the sleeve valve in a manner such that the shaft axis is perpendicular to the longitudinal axis of the main body and attaching the distal end of each of the arms to opposite sides of the gate, the arcuate motion of the arms moves the gate along an axis of the main body.

Various types of drive mechanisms are used to provide the torque necessary to rotate the shaft of conventional arm-driven sleeve valves. Such drive mechanisms often include a worm gear connected to either a hand-crank or electro-mechanical motor. It is important to understand that when moving the gate, it is desirable that each arm exert an equal force on the gate to prevent the gate from binding with the main body. For this reason, the drive mechanism of a conventional arm-driven sleeve valve is typically configured to apply torque to the shaft at a location centrally between the arms such that torsional deflection of the shaft will not cause one arm to exert a greater axial force on the gate than the other. Alternative configurations of attaching drive mechanisms include applying torque equally to the opposite ends of the shaft.

While the above mentioned configurations of applying torque to the shaft of an arm-driven sleeve valve may prevent the gate from binding with the main body, such configurations have associated disadvantages. Configurations in which the torque is applied to the shaft centrally between the arms require the shaft to be positioned further from the gate to accommodate gearing or, alternatively, requires more complicated gearing than would otherwise be required. Applying torque to the ends of the shaft allows the shaft to be positioned closer to the gate but requires redundant components and some additional means of ensuring that equal torque is applied to each of the opposite ends of the shaft.

SUMMARY OF THE INVENTION

Among the advantages of the present invention may be noted the provision of a sleeve valve configured such that each of the arms exerts an equal axial force on the gate, regardless of how torque is applied to the shaft. The present invention prevents the gate of the sleeve valve from binding against the main body while driving the rotation of the shaft asymmetrically from only one end of the shaft.

In general, the sleeve valve of the present invention comprises a main body, a gate, a shaft, and a pair of arm portions. The main body has a generally cylindrical exterior surface defining a central longitudinal axis and an internal fluid passage. The gate is slidably connected to main body for controlling fluid flow from the main body in response to axial movement of the gate relative to the main body. The shaft has a longitudinal axis and is mounted to a sleeve valve for rotation about its longitudinal axis. Additionally, the shaft is positioned laterally spaced from the central axis of the main body with the longitudinal axis of the shaft being perpendicular to the central axis of the main body. The pair of arms are mounted on the shaft and extend away from the axis of the shaft toward distal portions of each arm that are connected to opposite sides of the gate. The arms and shaft are configured and adapted so that rotation of the arms around the shaft is prevented by a connection between the shaft and a portion of the arms at a location centrally between the two arms. The central positioning of the connection between the shaft and arms substantially eliminates the possibility of the arms twisting about the shaft relative to each other due to torsional deflection of the shaft. Thus, the rotation of the shaft can be driven asymmetrically from only one of opposite axial ends of the shaft without causing the arms to exert unequal forces on the gate. The present invention thereby allows a simpler more compact drive mechanism to be used to operate the valve compared to conventional central or duel mounted drive mechanisms.

Another aspect of the invention further comprises a sleeve valve in which a single key-pin attachment forms the anti-rotational connection between the pair of arms and the shaft. The use of a single key-pin prevents undesirable twisting of the arms that could otherwise result from uneven wear or partial loosening of separate connections between each of the pair of arms and the shaft.

Other features and advantages will be in part apparent and in part pointed out hereinafter.

BRIEF DESCRIPTION OF THE DRAWINGS

Corresponding reference characters indicate corresponding parts throughout the several views of the drawings.

DESCRIPTION OF PREFERRED EMBODIMENT

Figure 1:
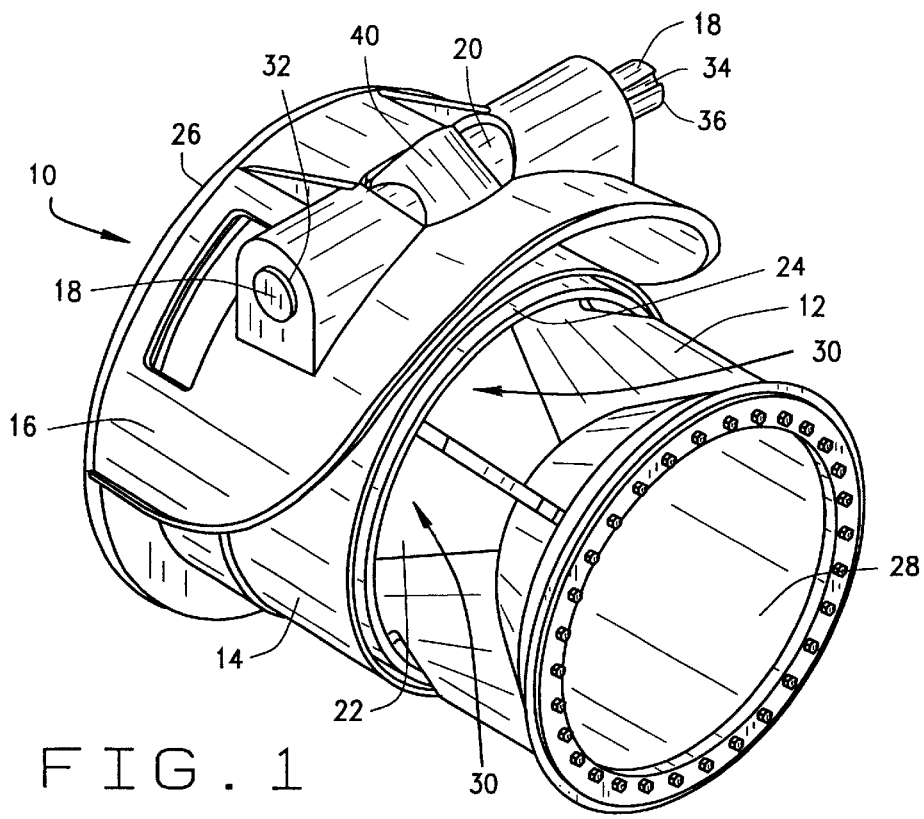
FIG. 1 is an isometric view of a sleeve valve of the present invention shown with gate in an open position relative to the main body of the valve.
Figure 2:
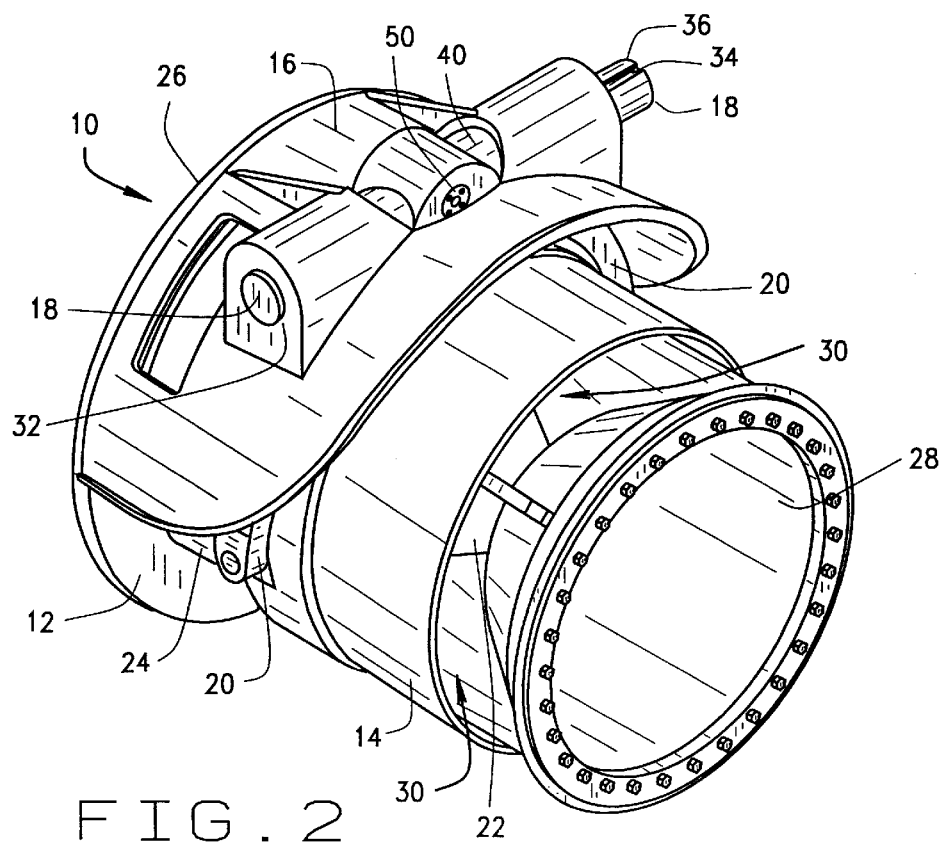
FIG. 2 is an isometric view of the sleeve valve of FIG. 1 shown with the arms swung such that the gate is between the open and closed positions relative to the main body of the valve.

Referring now to the drawings, and more particularly to FIGS. 1 and 2, an arm-driven sleeve is indicated in its entirety by the reference numeral 10. Preferably the sleeve valve 10 is positioned in a tank or stilling well (not shown), and is adapted to be connected to a fluid supply line (not shown), such as a water supply system. The purpose of the sleeve valve 10 is to regulate the flow rate of fluid from the supply line into the tank or stilling well.

Figure 5:
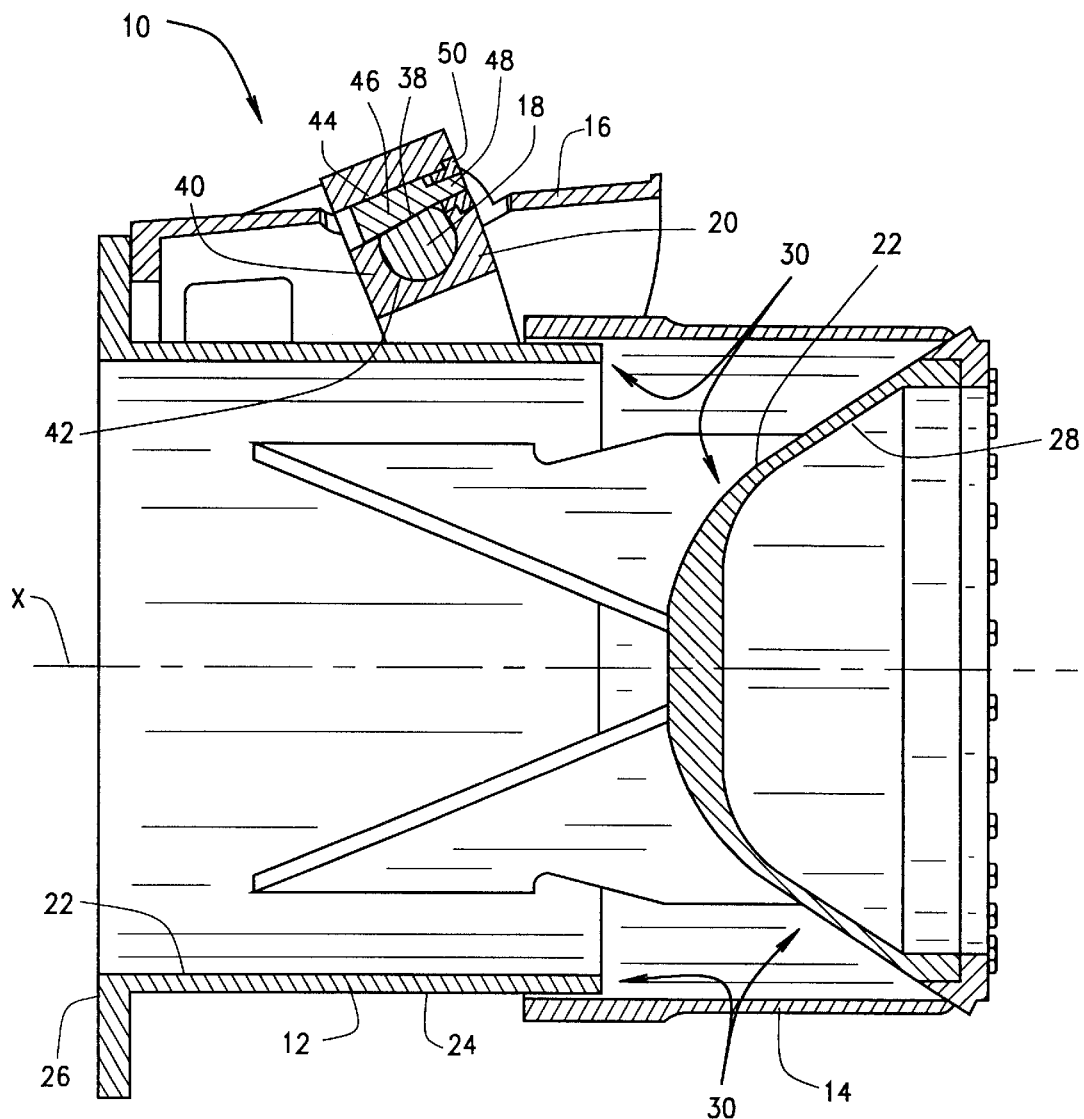
FIG. 5 is a cross-sectional view of the sleeve valve of FIG. 1 taken about the central plane of the valve with the gate of the valve in the closed position relative to the main body.

The sleeve valve 10 preferably comprises a main body, generally indicated at 12, a gate, generally indicated at 14, a shroud, generally indicated at 16, a shaft generally indicated at 18, and a pair of arms, generally indicated at 20. The main body 12 is generally tubular and has an inner surface 22 defining a fluid passage and an outer cylindrical surface 24 that defines a central longitudinal axis X as shown in FIG. 5. Additionally, the main body 12 preferably has a first axial end 26 that creates a mouth to the fluid passage and is configured to connect the main body to the fluid supply line in a manner so that fluid from the fluid supply line flows into the fluid passage of the main body. An opposite second axial end 28 of the main body 12 is preferably closed by an imperforate bulkhead to prevent fluid discharge therefrom. Additionally, the main body 12 has one or more discharge openings 30 adapted to allow fluid to pass from the fluid passage of the main body into the tank or stilling well.

Figure 3:
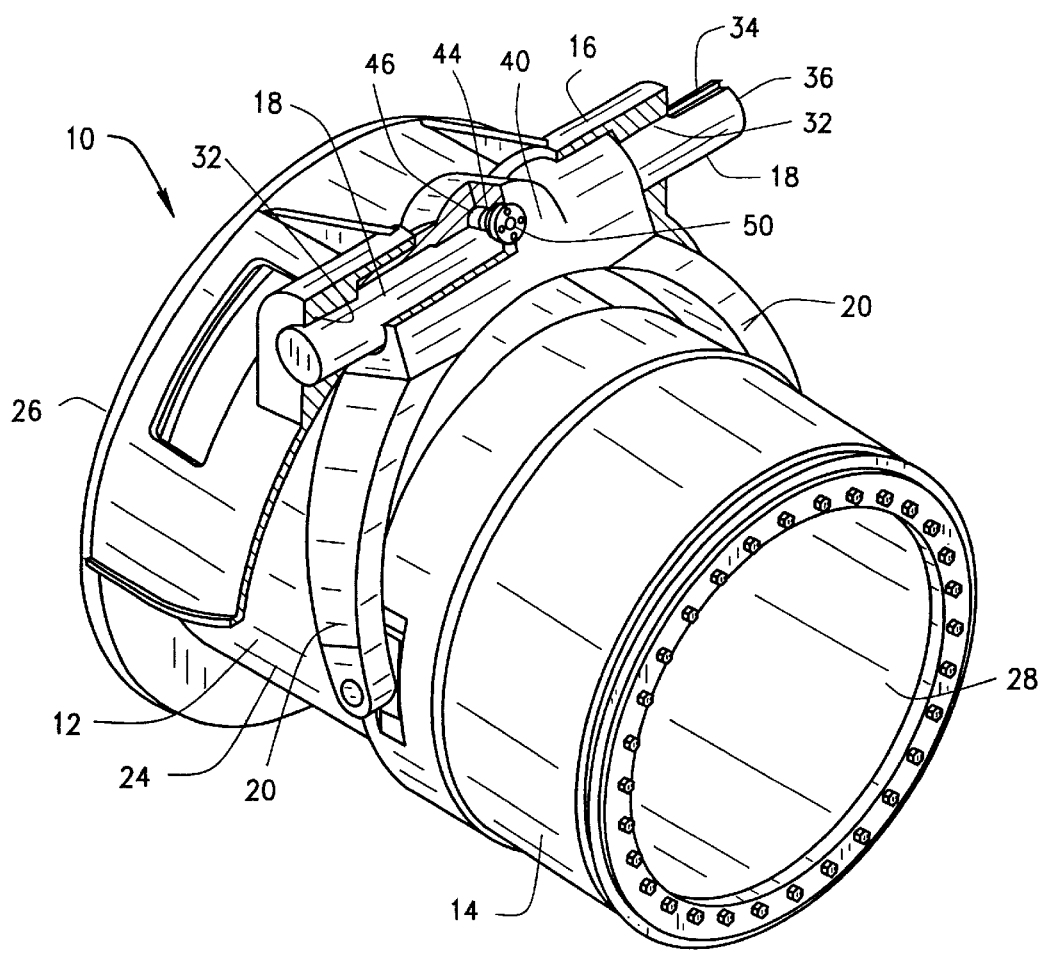
FIG. 3 is an isometric view of the sleeve valve of FIG. 1 shown with the gate in the closed position, with portions of the valve removed for clarity.

The gate 14 is preferably a tubular-shaped body engaged with the main body 12 of the valve 10 in a manner that allows the gate to slide axially between an open and closed position thereon. In the closed position, as shown in FIGS. 3 and 5, the gate 14 completely covers the discharge openings 30 of the main body 12 to prevent fluid from flowing therethrough. Additionally, a pair of annular seal rings (not shown), attached to the main body 12 on axially opposite sides of the discharge openings 30, preferably engage with the inner surface of the gate 14 to prevent fluid from discharging into the tank or stilling well from between the main body and the gate. In the open position, as shown in FIG. 1, the gate 14 is positioned axially to one side of the discharge openings 30 to allow fluid to flow from the fluid passage of the main body 12 into the tank or stilling well unobstructed. In between the open and closed positions, as shown in FIG. 2, the gate 14 partially obstructs one or more of the discharge openings 30 of the main body 12 to regulate the fluid flow rate.

The shroud 16 is preferably rigidly mounted to the main body 12 of the sleeve valve 10 and preferably extends over the gate 14 with a radial gap therebetween. The shroud 16 is configured and adapted for supporting the shaft 18 perpendicular to a central plane containing the central longitudinal axis X of the main body 12. Furthermore, the shroud 16 preferably has two bearing surfaces 32 positioned on opposite sides of the central plane that are configured to support the shaft 18 such that the shaft can rotate about the shaft's longitudinal axis relative to the shroud, with a portion of the shaft being positioned in the radial gap between the shroud and gate 14.

Figure 4:
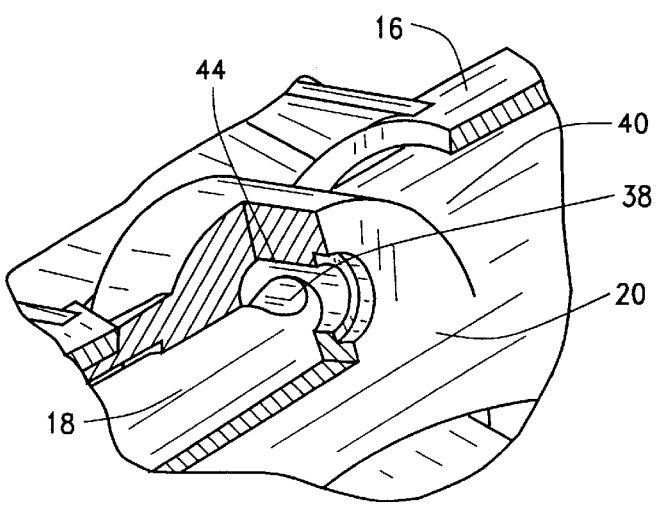
FIG. 4 is a detailed partial view of FIG. 3 showing details of the torsional connection between the arms and the shaft of the sleeve valve.

The shaft 18 preferably is a single solid cylindrical member and preferably has a longitudinally extending notched keyway 34 on a first axial end 36 of the shaft and is preferably positioned off-center with the central plane such that the first axial end of the shaft extends slightly from a side of the shroud 16 as shown in FIGS. 1–3. This configuration allows a drive mechanism (not shown) to be mounted to the shroud 16 where it can engage with the notched keyway 34 for controlling the rotation of shaft 18 relative to valve 10. Furthermore, the shaft 18 preferably has and a laterally extending semi-cylindrical keyway 38 longitudinally positioned on the shaft where the semi-cylindrical keyway lies at the central plane of the valve 10 when the shaft is being supported by the shroud 16, as shown in FIG. 4.

The arms 20 are preferably formed as a single monolithic piece having a generally horseshoe shaped cross-section configured and adapted for straddling the gate 14. Each of the arms 20 is attached to opposite sides of the gate 14 in a manner that allows the arms 20 to move the gate axially relative to the main body 12 as the arms are swung. A common, central portion 40 of the arms 20 is preferably configured and adapted for supporting the arms on the shaft 18 of the valve 10 and preferably has a bore 42 that is configured to engage around the portion of shaft in the radial gap between the shroud 16 and gate 14, for radially supporting the arms on the shaft. A cylindrical keyway 44 in the central portion 40 of the arms 20 preferably extends perpendicular to the bore 42 and is configured to receive a tapered key-pin 46 as shown in FIGS. 3 and 5.

The tapered key-pin 46 preferably is of the type disclosed in U.S. Pat. No. 4,579,477, the disclosure of which is hereby incorporated by reference, and preferably has a threaded protrusion 48 extending from the narrower end of the key-pin. By positioning the semi-cylindrical keyway 38 of the shaft 18 at an angle relative to the keyway 44 of the arms 20, as shown in FIGS. 4 and 5, the tapered key-pin 46 can be inserted, narrow end first, into the keyways 38, 44. Once inserted, a locking nut 50 is preferably engaged with the threaded portion 48 of the tapered key-pin 46 to draw the tapered key-pin against the keyways 38, 44, of the arms 20 and shaft 18, thereby eliminating any gap between the keyways and the tapered key-pin. In this position and configuration, the tapered key-pin 46 rotationally locks the arms 20 to the shaft 18 such that the arms swing in response to rotation of the shaft. Thus, equal torque is transmitted to each of the arms 20, regardless of torsional deflection of the shaft 18. As a result, the shaft 18 can be driven asymmetrically without resulting in one of the arms 20 exerting a greater force on the gate 14 than the other of the arms.

As various changes could be made in the above construction without departing from the scope of the invention, it is intended that all matter contained in the above description or shown in the accompanying drawings shall be interpreted as illustrative and not in a limiting sense.

What is claimed is:

1. A sleeve valve comprising:

a main body having a generally cylindrical exterior surface defining a central longitudinal axis and an interior surface defining an internal fluid passage, the main body also having at least one opening connecting the internal fluid passage to an environment external of the valve, the opening being adapted for passage of fluid therethrough;

a tubular gate slidably mounted around the main body for axial movement between closed and open positions relative to the main body, the gate and main body being adapted to permit fluid flow through the at least one opening of the main body when the gate is in the open position and to prevent fluid flow through the at least one opening when the gate is in the closed position;

a shaft having a shaft axis spaced laterally from the central longitudinal axis of the main body and perpendicular to a central plane containing the central longitudinal axis, the shaft being operatively connected to the main body for rotation about the shaft axis; and a pair of arm portions extending at an angle from the shaft axis and being connected to the shaft in a manner to rotate with the shaft about the shaft axis in a swinging manner relative to the main body, one of the pair of arm portions being connected to the gate on a first side of the central plane and the other of the pair of arm portions being connected to the gate on a second opposite side of the central plane for axially moving the gate between the closed and open positions upon rotation of the shaft, the pair of arm portions being connected to the shaft in a manner such that each of the pair of arm portions will exert an equal force on the gate independently of any torsional deflection of the shaft when torque is exerted on the shaft.

2. The sleeve valve of claim 1, wherein:

each of the pair of arm portions is directly and rigidly connected to the other.

3. The sleeve valve of claim 2, wherein:

each of the pair of arm portions extends in an arcuate manner partially around the gate.

4. The sleeve valve of claim 1, further comprising:

a single key pin aligned with the center plane that engages a keyway in the pair of arm portions and in the shaft, the key pin providing the sole torsional connection between the shaft and the pair of arm portions.

5. The sleeve valve of claim 1, wherein:

the shaft has opposite axial ends and is adapted to be driven rotationally about the shaft axis by torque applied solely to one of the opposite ends of the shaft.

6. The sleeve valve of claim 5, further comprising:

a single key pin aligned with the center plane that engages a keyway in the pair of arm portions and in the shaft, the key pin providing the sole torsional connection between the shaft and the pair of arm portions.

7. The sleeve valve of claim 6, wherein:

each of the pair of arm portions extends in an arcuate manner partially around the gate.

8. A sleeve valve comprising:

a main body having a generally cylindrical exterior surface defining a central longitudinal axis and an interior surface defining an internal fluid passage, the main body also having at least one opening connecting the internal fluid passage to an environment external of the valve, the opening being adapted for passage of fluid therethrough;

a tubular gate slidably mounted around the main body for axial movement between closed and open positions relative to the main body, the gate and main body being adapted to permit fluid flow through the at least one opening of the main body when the gate is in the open position and to prevent fluid flow through the at least one opening when the gate is in the closed position;

a shaft having a shaft axis spaced laterally from the central longitudinal axis of the main body and perpendicular to a central plane containing the central longitudinal axis, the shaft being operatively connected to the main body for rotation about the shaft axis; and a pair of arm portions extending at an angle from the shaft axis and being connected to the shaft in a manner to rotate with the shaft about the shaft axis in a swinging manner relative to the main body, the arm portions also being connected to the shaft in a manner such that all torsion transmitted between the shaft and the arm portions occurs in close proximity to the central plane, one of the pair of arm portions being connected to the gate on a first side of the central plane and the other of the pair of arm portions being connected to the gate on a second opposite side of the central plane for axially moving the gate between the closed and open positions upon rotation of the shaft.

9. The sleeve valve of claim 8, wherein:

each of the pair of arm portions is directly and rigidly connected to the other.

10. The sleeve valve of claim 9, wherein:

each of the pair of arm portions extends in an arcuate manner partially around the gate.

11. The sleeve valve of claim 8, further comprising:

a single key pin aligned with the center plane that engages a keyway in the pair of arm portions and in the shaft, the key pin providing the sole torsional connection between the shaft and the pair of arm portions.

12. The sleeve valve of claim 8, wherein:

the shaft has opposite axial ends and is adapted to be driven rotationally about the shaft axis by torque applied solely to one of the opposite ends of the shaft.

13. The sleeve valve of claim 12, further comprising:

a single key pin aligned with the center plane that engages a keyway in the pair of arm portions and in the shaft, the key pin providing the sole torsional connection between the shaft and the pair of arm portions.

14. The sleeve valve of claim 13, wherein:

each of the pair of arm portions extends in an arcuate manner partially around the gate.

15. A sleeve valve comprising:

a main body having a generally cylindrical exterior surface defining a central longitudinal axis and an interior surface defining an internal fluid passage, the main body also having at least one opening connecting the internal fluid passage to an environment external of the valve, the opening being adapted for passage of fluid therethrough;

a tubular gate slidably mounted around the main body for axial movement between closed and open positions relative to the main body, the gate and main body being adapted to permit fluid flow through the at least one opening of the main body when the gate is in the open position and to prevent fluid flow through the at least one opening when the gate is in the closed position;

a shaft having a shaft axis spaced laterally from the central longitudinal axis and perpendicular to a central plane containing the central longitudinal axis of the main body, the shaft being operatively connected to the main body for rotation about the shaft axis; and a pair of arm portions extending at an angle from the shaft axis and being connected to the shaft in a manner to rotate with the shaft about the shaft axis in a swinging manner relative to the main body, one of the pair of arm portions being connected to the gate on a first side of the central plane and the other of the pair of arm portions being connected to the gate on a second opposite side of the central plane for axially moving the gate between the closed and open positions upon rotation of the shaft, the arm portions being directly and rigidly connected to one another.

16. The sleeve valve of claim 15, wherein:

each of the pair of arm portions extends in an arcuate manner partially around the gate.

17. The sleeve valve of claim 16, further comprising:

a single key pin aligned with the center plane that engages a keyway in the pair of arm portions and in the shaft, the key pin providing the sole torsional connection between the shaft and the pair of arm portions.

18. The sleeve valve of claim 15, wherein:

the shaft has opposite axial ends and is adapted to be driven rotationally about the shaft axis by torque applied solely to one of the opposite ends of the shaft.

19. The sleeve valve of claim 18, further comprising:

a single key pin aligned with the center plane that engages a keyway in the pair of arm portions and in the shaft, the key pin providing the sole torsional connection between the shaft and the pair of arm portions.

20. The sleeve valve of claim 19, wherein:

each of the pair of arm portions extends in an arcuate manner partially around the gate.

21. The sleeve valve of claim 20 wherein:

the pair of arm portions are formed as a single monolithic member.

* * * * *